United States Patent [19]
Sano et al.

[11] Patent Number: 5,901,017
[45] Date of Patent: May 4, 1999

[54] SUSPENSION FOR A MAGNETIC HEAD

[75] Inventors: Akinobu Sano; Kuniyuki Takao; Kozo Bun, all of Shizuoka-ken, Japan

[73] Assignee: Minebea Co., Ltd., Kitasaku, Japan

[21] Appl. No.: 08/949,621

[22] Filed: Oct. 14, 1997

[30]     Foreign Application Priority Data

Jul. 8, 1997   [JP]   Japan .................................... 9-182113

[51] Int. Cl.⁶ ...................................................... G11B 5/60
[52] U.S. Cl. ............................................................ 360/104
[58] Field of Search ................................................ 360/104

[56]            References Cited

U.S. PATENT DOCUMENTS 5,490,027   2/1996   Hamilton et al. ........................ 360/104
  5,594,607   1/1997   Erpelding et al. ...................... 360/104

FOREIGN PATENT DOCUMENTS

A-7-296536   11/1995   Japan .
  A-8-30946     2/1996   Japan .
  A-8-111015    4/1996   Japan .

*Primary Examiner*—Robert S. Tupper
*Attorney, Agent, or Firm*—Oliff & Berridge, PLC.

[57]            ABSTRACT

The pattern of wiring 11 itself has an elasticity. That is, the pattern of wiring 11 as an electric signal exchanging means functions also as a load giving means. Accordingly, comparing the case where the electric signal exchanging means and the load giving means are separated, the number of the parts can be reduced. And, since the process of assembling conventional every part can be reduced, deletion of the number of processes can be carried out.

In addition, a snapping of a wire during assembling is avoided and prevented a product from being deteriorated.

8 Claims, 4 Drawing Sheets

SUSPENSION FOR A MAGNETIC HEAD

BACKGROUND OF THE INVENTION

1. Field of the Invention

The present invention relates to a suspension for a magnetic head for use of such as a floppy disk drive and hard disk drive as an auxiliary storage device for computers.

2. Prior Art

For example, a magnetic head for reading/writing data on a recording medium such as a disk for a hard disk drive is suspended by a suspension for a magnetic head as shown in FIG. 7. The suspension 1 for a magnetic head (hereinafter referred to as "suspension") is made of a metal material having elasticity and comprises a load beam portion 2 and a base plate portion 3. Of these, the load beam portion 2 functions as the suspension of a magnetic head slider 4 to give an appropriate load on it. And, the base plate portion 3 is provided with a position determining projection 5 for functioning as a mounting portion which mounts the suspension to a not shown carriage, and has a function to hold the load beam portion 2.

The magnetic head slider 4 is adhered to the tip end of the load beam portion 2. Further, a magnetic head core of the suspension 1 is provided with a winding, and from the winding a coil leading wire 6 is pulled out. And, the coil leading wire 6 is covered with an insulation tube 7. Further, claws 2a and 3a formed in a unit on the load beam portion 2 and the base plate portion 3 function for fastening the leading wire 6 together with its insulation tube 7 on the suspension 1.

Further, although not shown in figures, in the case of a thin-film magnetic head slider, where a magnetic head core is formed with a thin-film, since there is no need of provision of winding a coil, the slider is provided with a land where a leading wire is connected, and the leading wire 6 is connected thereto.

In the above conventional art, the insulating tube 7 has to be prepared for insulating the lead wire 6 which is necessary for the coil, which has caused to increase the number of parts and assembling processes.

Therefore, in order to solve this problem, an idea to connect a base which is made of insulating substrate formed with a pattern of a printed circuit having a flexibility to a magnetic head has been developed. The detail of this process is disclosed, as prior art, in Patent Laid-open Nos. Hei 7-296536, 8-30946 and 8-111015.

Now, in the conventional arts having the above constitutions, by using a metal such as stainless steel having an elasticity as a suspension 1 and by making use of its elasticity, an appropriate load is given (Hereinafter suspension 1 is referred as "load giving means".).

Further, as a means to exchange an electrical signal with the magnetic head slider 4, a base on which a coil leading wire 6 is formed or which is made of insulating base material having flexibility printed with a pattern of circuit (hereinafter referred to as "an electrical signal exchanging means") is fixed to the suspension 1 by some means. That is, the magnetic head slider 4 must be provided with two means, one of which is at least a load giving means and the other one is an electrical signal exchanging means. By the way, the stainless steel forming the suspension 1 is expensive in its cost, and in addition it is necessary to carry out extra processes for fixing the above two means, so that the total cost for manufacturing the suspension has become increased.

SUMMARY OF THE INVENTION

The purpose of the present invention is to decrease the cost of a suspension by reducing the number of parts constituting the suspension for a magnetic head and the number of assembling processes.

Accordingly, a constitution in the present invention comprises a suspension for a magnetic head which reads/writes on a recording medium while contacting to or floating above the recording medium, and is characterized in that the suspension is provided with an electrically conductive material which functions also as a spring means to regulate a load to be given to the magnetic head. According to the present invention, since the electrically conductive material functions also as a means to give an appropriate load to the magnetic head, it does without the processes to assemble two members which function separately.

In addition, in the present invention, since a coating member contains the electrically conductive material (it is meant for a coating member to coat an electrically conductive material), it can avoid from being influenced by deterioration such as insulation, and impact resistance due to the mechanical contact between parts or some influences from outside. Further, due to the usage of engineering plastic for the coating material, heat resistance, high-impact resistance, chemical resistance, bending strength, tensile strength, coefficient of elasticity and dimension stability are guaranteed and the property as a coating member is not deteriorated.

Further, due to exposing a part of the electrically conductive material from the coating member, a difference in property of bending is generated between the part of the electrically conductive member coated with the coating member and the part exposed. And, since electrical connecting terminals which are to be connected to the electrically conductive material contained in the coating member are provided in the vicinity where the slider of the magnetic head is connected, the connection between the magnetic head slider and the electrically conductive member is secured.

Further, in the case where the coating member is formed from either one of polyether sulfon or polyether amide, the coating material is entitled to bear, as the coating property which is expected to have, the most suitable one.

Further, in the case where the electrically conductive material is made of any one of beryllium copper, phosphor bronze or stainless steel, it will suffice both abilities of exchanging an electrical signal with the magnetic head and giving load.

In addition, due to provision of a shield for electromagnetic waves, the influence from some outer noises is prohibited to pull out sufficiently the function of the magnetic head.

DETAILED DESCRIPTION OF PREFERRED EMBODIMENTS

Hereinafter, a preferable embodiment of the present invention will be explained based on the attached drawings.

Here, portions identical with or corresponding to a conventional art are indicated in the same signs and detailed explanation is omitted.

Figure 1:
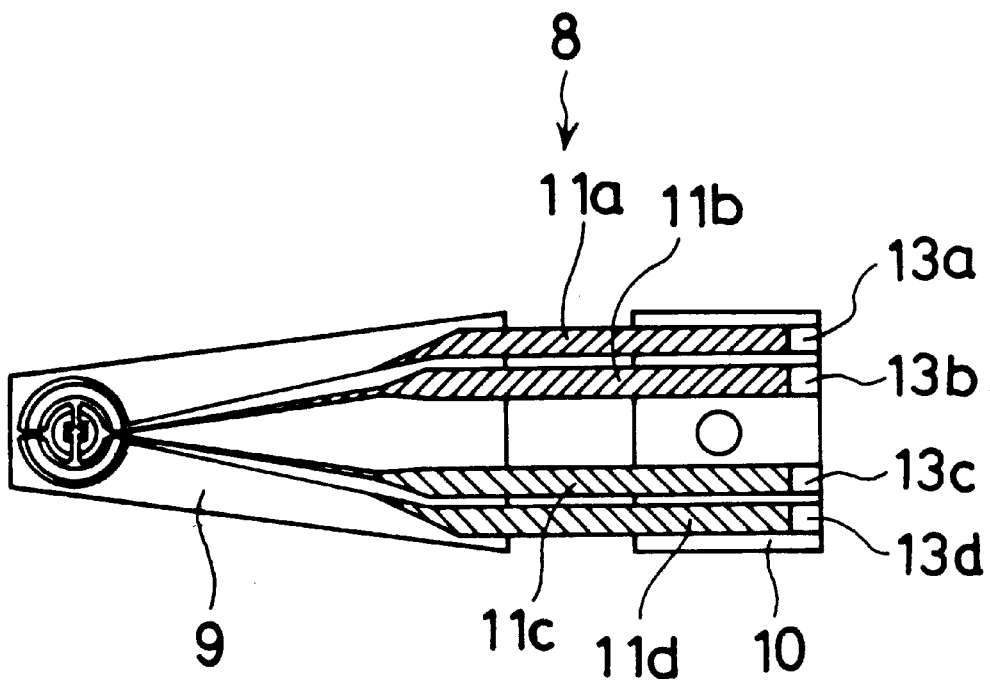
FIG. 1 is a sectional view of the internal structure of the suspension for a magnetic head.
Figure 2:
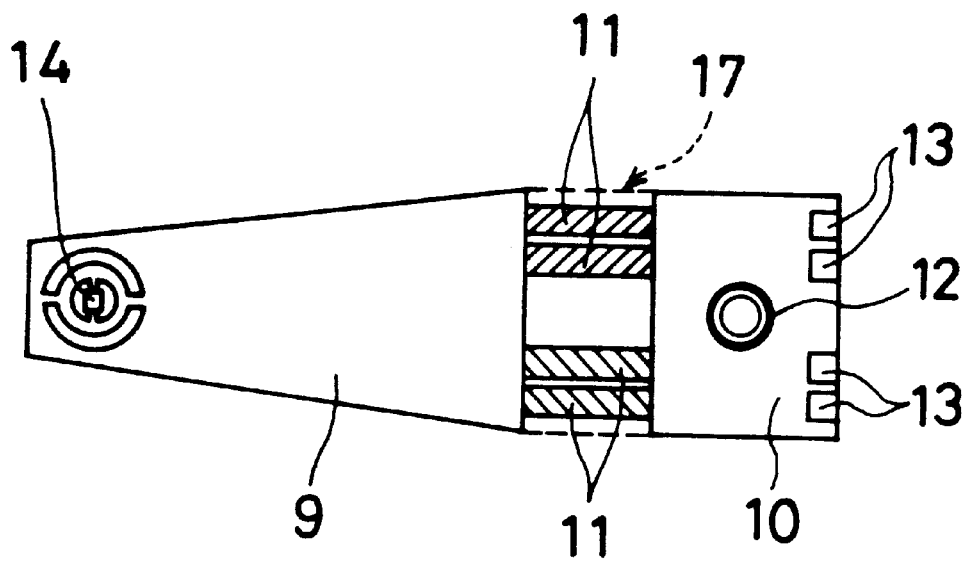
FIG. 2 is a plan view of the suspension.
Figure 3:
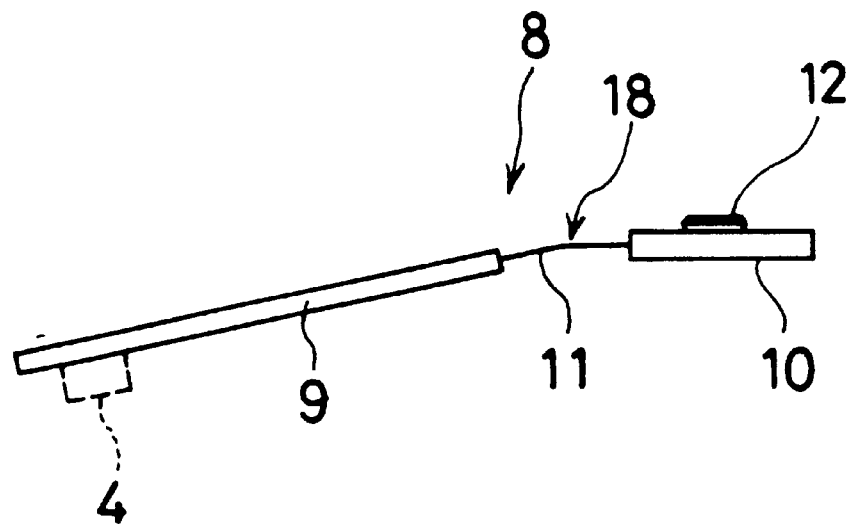
FIG. 3 is a side view of the suspension.
Figure 4:
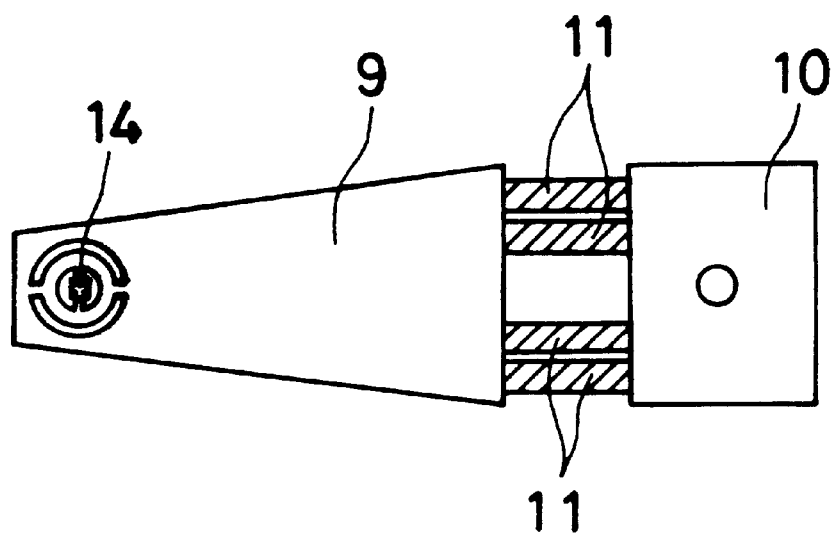
FIG. 4 is a bottom view of the suspension of FIG. 1.
Figure 5:
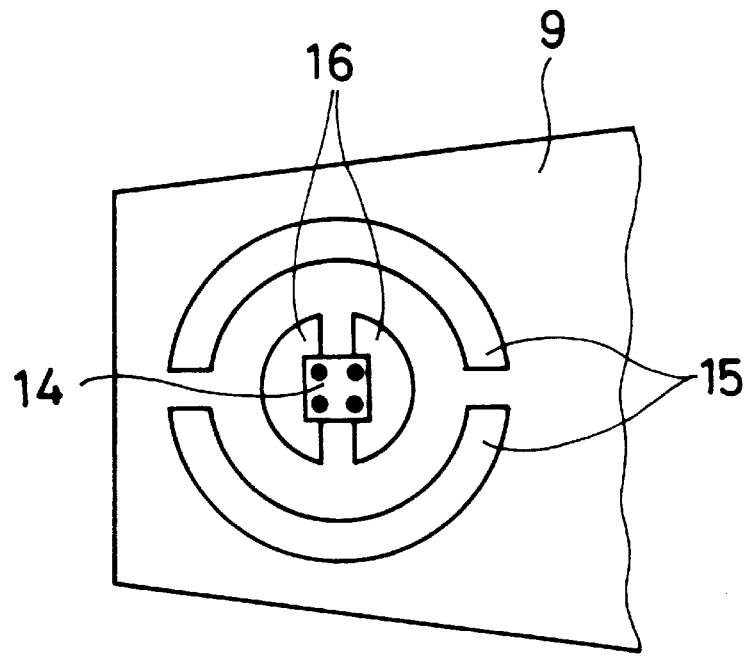
FIG. 5 is an enlarged view of the tip end of the suspension shown in FIG. 4.
Figure 6:
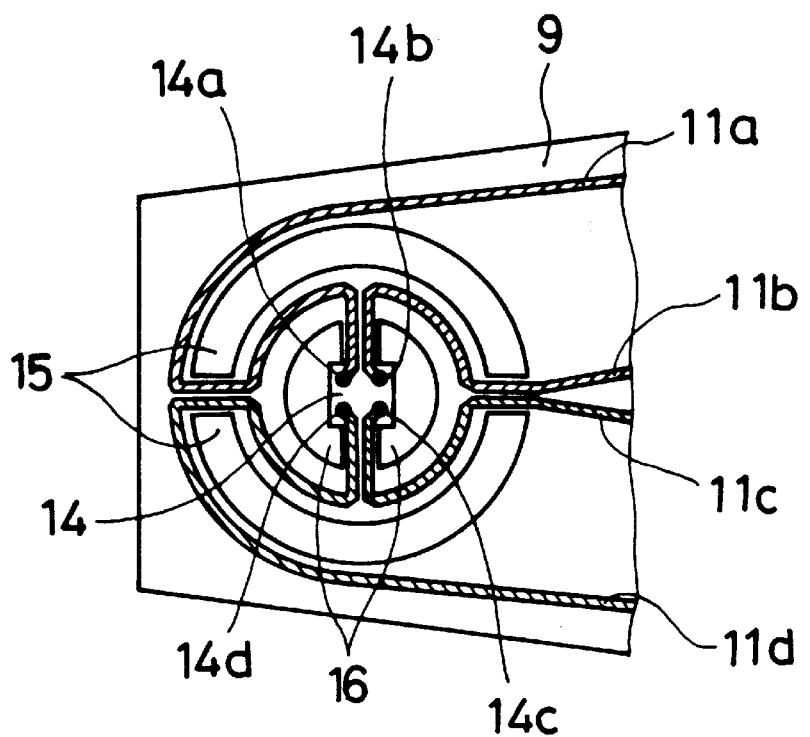
FIG. 6 is an enlarged view of the tip end of the suspension shown in FIG. 1.
Figure 7:
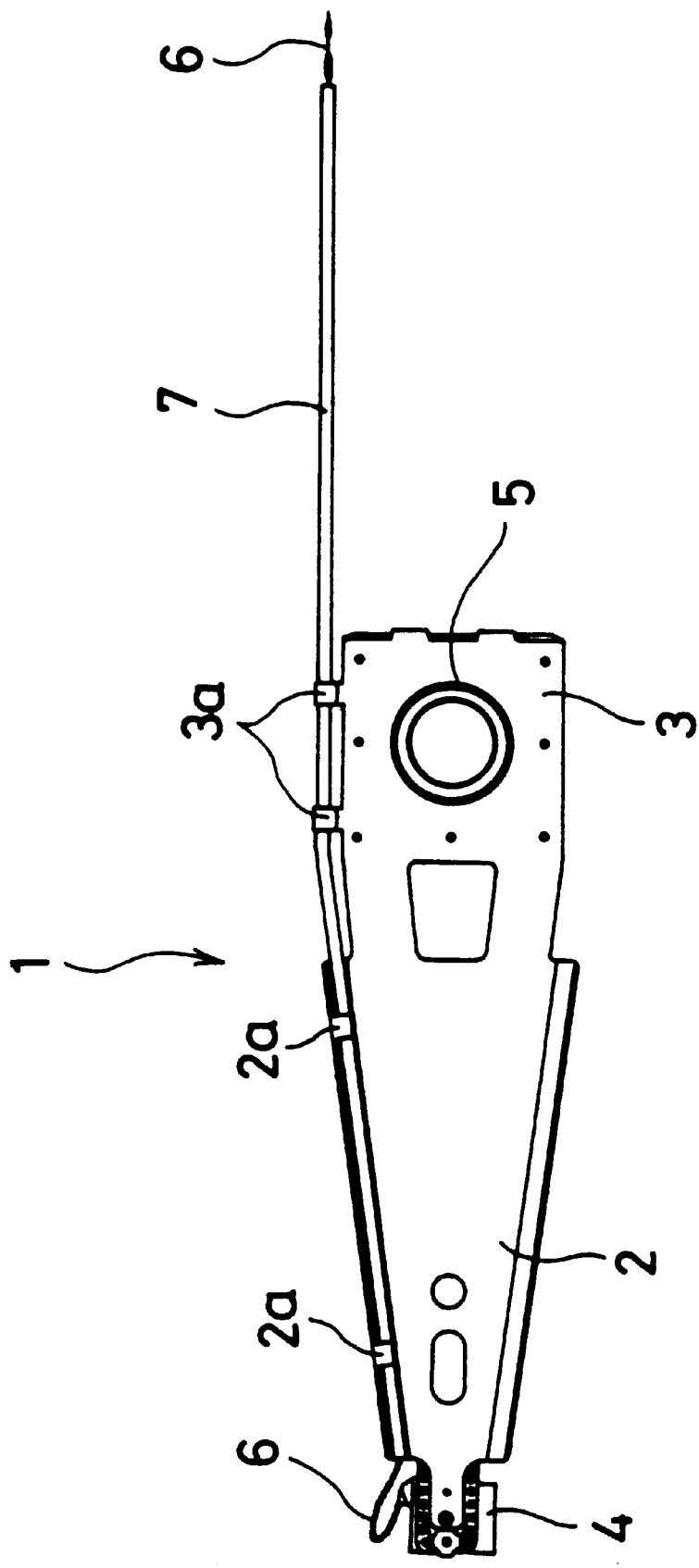
FIG. 7 is an plan view of a suspension of a prior art.

In FIGS. 1–6, a suspension according to an embodiment of the present invention is indicated. FIG. 1 is a sectional view illustrating an internal structure of a suspension 8 of a magnetic head, FIG. 2 is a plan view, FIG. 3 is a side view and FIG. 4 is a bottom view. And, FIG. 5 is an enlarged and bottom view of the tip end of the suspension and FIG. 6 is a sectional view indicating the internal structure of FIG. 5.

The suspension 8 according to the embodiment of the present invention is made of a synthetic resin concerning a load beam portion 9 and a base plate portion 10. and, as shown in FIG. 1, inside the load portion 9 and the base portion 10, a pattern of wiring 11 consisting of electrically conductive material is insert-molded so as to be connected each other. As shown in figure, the load beam portion 9 and the base portion 10 are separated and a part of the pattern of the wiring 11 (a part between the beam 9 and the base plate portion 10) is exposed.

At the tip end portion of the load beam 9, a contact portion 14 described later is provided, where a magnetic head slider 4 is adhered. Further, at the base plate portion 10, a projection portion 12 for positioning, which is also a mounting portion to mount the suspension on a not shown carriage. As a material for use of these load beam portion 9 and the base plate portion 10, the engineering plastic such as polyether sulfon and polyether imide is most suitable. These materials are superior in heat resistance, impact resistance, chemical resistance, bending strength, tensile strength, coefficient of elasticity and dimension stability, which contribute to give necessary properties to the suspension. Further, as material for the pattern of wiring 11, since it needs an electrical conductivity and an elasticity, a metal such as beryllium copper, phosphor bronze or stainless steel is suitable.

The pattern of wiring 11 shown in FIG. 1 illustrates the case where it forms four terminals (not limited to this case, for instance, cases where it forms three or two terminals are included), signs 11a–11d are given to every pattern of wiring relating to each terminal. On the end of the base plate 10, terminal portions 13 (13a–13d) for being connected to some outer circuits are exposed at four spots.

Further, the pattern of wirings 11a–11d are, as shown in FIG. 6, connected to four contacts 14a–14d of a contact portion 14 (contact portion for the magnetic head slider 4 indicated in dotted line in FIG. 3) exposed at the tip portion of the load beam 9.

The contact portions 13 and 14 are treated with gold plating for the purpose of increasing the electrical conductivity and preventing corrosion. By connecting to this contact portion 14, the magnetic head slider 4 can be electrically connected through contacts 14a–14d to the pattern windings 11a–11d.

Now, in order to increase a follow up characteristic of the head slider 4 to the recording medium (illustration is omitted), as shown in FIGS. 5–6, punched holes 15, 16 are formed around the contact portion 14 of the wirings 11a–11d.

Thereby, at the portions of each of the wiring 11a, 11d avoiding the punched holes 15 and 16 and of the engineering plastic, an elastic deformation is easily generated, and the contact portion 14 (i.e. the magnetic head slider 4) becomes possible to be freely displaced to the load beam portion 9.

Next, the manufacturing processes of the above suspension 8 for the magnetic head thus constructed are explained as follows.

First, as shown in FIGS. 1 and 6, a metallic pattern of wirings 11a–11d is provided and these are insert-molded with an engineering plastic, in which the pattern of wiring 11 other than the contact portions 13 and 14 becomes only coated with the engineering plastic (in this invention such state is called "enveloped"). Therefore, in this process of this timing the portion 17 also indicated by the dotted line in FIG. 2 is covered with the engineering plastic, and the load beam portion 9 and the base plate portion 10 are in the continuous state. In this case, let the thickness of the pattern of wiring 11 be for instance in 0.06–0.1 mm, then the thickness of the corresponding plastic portion enveloping the wiring is made in 0.2 mm.

Next, a plastic removing process such as by etching is applied, and the plastic portion indicated in 17 in FIG. 2 is removed to expose the pattern of wiring 11. At the same time, similarly by etching the punched holes 15, 16 are formed as shown in FIGS. 5 and 6.

Finally, for the purpose of giving a suitable pressurization to the magnetic head slider 4, as shown in FIG. 3, at the exposed portion of the pattern of wiring 11, the suspension functions as a bending portion 18. For reference, it is a matter of course to be able initially to mold the load beam portion 9 and the base plate portion 10 separately without filling the mold in the portion indicated in 17 in FIG. 2. In this case, a partial plastic-removing process by etching can be omitted.

And, except the contact portions 13, 14 and the exposed portion of the pattern of wiring 11, by applying a shield for electromagnetic waves on the surface of the suspension, any noise coming from outside can be controlled. As a shield material for shielding the electromagnetic waves to be used here, an electromagnetic waves shield such as coppers and Parmaloys is preferably coated or attached on the surface of the suspension excepting the contact portions 13, 14 and the exposed pattern of wiring 11.

For reference, at the time of fixing the suspension 8 to a carriage, the projected portion 12 for positioning is deposited on the carriage or carried out by adhering thereto with epoxy system adhesives. Further, an electric connection between the contact portion 13 and an outer circuit can be carried out by a direct wire bonding to a gold plated contact portion 13 and ball bonding thereto.

Operations and effects according to the above mentioned invention are as follows. First, since the pattern of wiring 11 itself has an elasticity, it is not necessary to use as in the conventional manner members (load giving means and electric signal exchanging means), which provide individual function separately, in combination with those. Therefore, the number of parts to be used will be reduced, and a process for assembling each of the conventional members is not necessary, which may result in reducing the number of processes. Further, while assembling, the snapping of a wire is not generated, thereby it can prevent generation or deterioration.

In addition, by coating the pattern of wiring 11 with an engineering plastic, the pattern of wiring 11 is prevented from being influenced by being in contact with other parts and from outside, such as insulation characteristic, and impact resistance against the pattern of wiring 11, and can prevent it from being deteriorated. Further, by exposing a part of the pattern of wiring 11, a difference of bending rigidity characteristic is generated. That is, since the bending rigidity at the exposed portion of the pattern of wiring 11 becomes low, a bending stress is concentrated on that portion.

Accordingly, the load added to the magnetic head slider 4 is controlled at this exposed portion and, the load control can be carried out easily and precisely.

It is a matter of course that the suspension can be used also in the state where all of the pattern of wiring 11 is coated with the engineering plastic. Contrary to that, by changing the configuration of the pattern of wiring 11 (mainly by strengthing the rigidity of the load beam portion 9 and the base plate portion 10 relatively), without coating all of the pattern of wiring it can be used. In addition, as a coating material, a material other than the engineering plastic can be used. Further, the rigidity of each part of the load beam portion 9, the base plate portion 10 and the pattern of wiring 11 can be increased by forming the configuration in sectional view of the widthwise direction of each part in a channel structure. Thereby, it makes the cost lower by forming the thickness of each part thinner to lighten the part or to reduce the mass of the material.

Next, the effects of the invention thus formed are explained as follows.

According to the suspension of the claim 1 of the present invention, since the electrically conductive member functions also as a member to give a load to the magnetic head and there is no need to assembly a plurality of members the functions of which are different individually, it can be planed to reduce the number of parts and processes and to avoid the breakage of the parts during an assembling process. Thereby, it is possible to supply a lower cost and more reliable suspension.

Additionally, since the electrically conductive member can be enveloped in a coating material, it is possible to plan to prevent the suspension from being influenced from being in contact with other parts and the outside, such as insulation characteristics and impact resistance to increase the endurance and the stability of the characteristic.

Also, by using the engineering plastic as the coating material, heat resistance, impact resistance, chemical resistance, bending strength, tensile strength, coefficient of elasticity and dimension stability are guaranteed and the characteristic as a coating material is not deteriorated. Thereby, it can be planned to increase the endurance of the suspension and stabilize the characteristic.

Further, by exposing partially the electrically conductive member from the coating material, a difference of bending characteristic between the coated portion and uncoated portion is guaranteed, and thereby the bending stress in accordance with the characteristic of each portion can be controlled. Accordingly, the control to be applied to the magnetic head can be carried out easily and precisely.

Further, the vicinity of the connection with the contacts portion to be connected to the enveloped electrically conductive material and the connection between the magnetic head slider and the electrically conductive material is secured to guarantee the exchanging of an electric signal therebetween.

Further, since the coating material is formed with either one of polyether sulfon or polyether amide, it contributes to increase the endurance of the suspension and to stabilize the characteristic.

In addition, by providing the electrically conductive material as any one of beryllium copper, phosphor bronze or stainless steel, it suffice the requirement of an electrical signal exchanging ability and a load giving ability, which contributes to increase of the characteristic required for the suspension.

Further, by providing an electromagnetic wave shield over the suspension, an influence from outer noise is avoided and the function of the magnetic head can be fully used. Accordingly, by suspending the magnetic head using the suspension of the present invention, the function of the apparatus which make use of these suspension may be increased.

What is claimed is:

1. A suspension for a magnetic head to read/write data while above a magnetic recording medium, comprising:

a load beam portion;

a base plate portion; and an electrically conductive member provided along a longitudinal direction of the load beam portion and the base plate portion, wherein the magnetic head is disposed at a distal end of the load beam portion, the electrically conductive member has elasticity, the load beam portion and the base plate portion are separated from each other in the longitudinal direction, and the base plate portion and the load beam portion are connected to each other with the electrically conductive member only.

2. The suspension for a magnetic head according to claim 1, wherein said electrically conductive member is enveloped in a coating member.

3. The suspension for a magnetic head according to claim 2, wherein said coating member is an engineering plastic.

4. The suspension for a magnetic head according to claim 2, wherein said electrically conductive member is exposed partially from the coating member.

5. The suspension for a magnetic head according to claim 2, wherein at a vicinity where a slider of the magnetic head is adhered, contact terminals to be connected by the electrically conductive member are provided.

6. The suspension for a magnetic head according to claim 2, wherein said coating member is formed from one of polyether sulfon and polyether imide.

7. The suspension for a magnetic head according to claim 1, wherein said electrically conductive member is formed from any of beryllium copper, phosphor bronze and stainless steel.

8. The suspension for a magnetic head according to claim 1, wherein an electromagnetic wave shield is provided.

* * * * *